United States Patent [19]
Suto

[11] Patent Number: 5,853,915
[45] Date of Patent: Dec. 29, 1998

[54] FOLDABLE MULTI-CONFIGURATION BATTERY PACK

[75] Inventor: Shohei Suto, Tokyo, Japan

[73] Assignee: Mattel, Inc., El Segundo, Calif.

[21] Appl. No.: 914,505

[22] Filed: Aug. 19, 1997

[51] Int. Cl.$^6$ ..................................................... H01M 2/10
[52] U.S. Cl. ............................................. 429/99; 429/100
[58] Field of Search ................................. 429/100, 99, 96

[56] References Cited

U.S. PATENT DOCUMENTS

| | | |
|---|---|---|
| 2,666,803 | 1/1954 | Kurlandsky . |
| 3,661,649 | 5/1972 | Kaye . |
| 3,855,534 | 12/1974 | Holcomb et al. . |
| 5,037,711 | 8/1991 | Bonnaud et al. . |
| 5,308,717 | 5/1994 | Gordin . |
| 5,472,804 | 12/1995 | Austin et al. . |

FOREIGN PATENT DOCUMENTS

| | | |
|---|---|---|
| 7238437 | 1/1973 | Germany . |
| 39 01 478 C1 | 3/1990 | Germany . |
| WO 94/15371 | 7/1994 | WIPO . |

OTHER PUBLICATIONS

Article from "Elektro Modell", vol. 2, Feb. 1994, copies of cover page and pp. 25–28.

*Primary Examiner*—John S. Maples
*Attorney, Agent, or Firm*—Panitch Schwarze Jacobs & Nadel, P.C.

[57] ABSTRACT

Battery pack for use in various electronic products are pivotably connected together by two parallel link assemblies which permit the two portions of the battery pack to be folded with respect to one another into various configurations. Each link assembly includes a rotary electrical connection, one link providing a supply path and the other link supplying a return path to the batteries in both casings. Wiper type contacts are supplied in each link. External contacts may be located in one of the two casings or one contact may be located on each of the two casings. In one embodiment a flexible printed circuit board wire trace is used to provide an electrical connection between opposing poles of cells in the two casings to eliminate the rotary electrical connection and potential for failure across such connection while still providing multiple configuration adjustability.

13 Claims, 8 Drawing Sheets

FOLDABLE MULTI-CONFIGURATION BATTERY PACK

BACKGROUND OF THE INVENTION

This invention relates to battery packs used in electronic products, and more particularly to battery packs having a plurality of individual cells located in a casing and electrically connected together within the casing such that a higher voltage can be obtained from the preassembled battery pack without the need for loading individual cells into the electronic device.

Portable electronic products, such as motorized children's toys, portable radios, cellular phones and the like, have become increasingly more popular. A significant volume component in these electronic products is dedicated to the battery space or compartment for receiving a battery pack for powering the device.

Generally, a battery pack is designed to be large enough to accommodate enough battery cells, which are connected either in series or in parallel, to provide enough energy at a desired voltage for a minimum acceptable operation time for the electronic device. While a larger battery pack which would provide more power for a longer time would often be desirable, the overall design of the device would have to take into account the additional required space and the aesthetic effect of accommodating a large battery pack.

It would also desirable to have a universal battery pack that could be used in connection with several different devices, such as a line of remote control toy vehicles. However, the shape of such a universal battery pack limits the designers flexibility in modifying or expanding the product line based on the need to accommodate the universal battery pack. While it is possible to provide custom designed battery packs for individual products in a product line, this is often impractical due to the high cost and lower volumes associated with such customization. Additionally, this would force retailers to carry a number of different size and shaped battery packs resulting in higher inventory costs for the store as well as additional confusion among consumers buying replacement battery packs.

It would be desirable to provide a universal battery pack which can be adjusted or formed into different shapes depending upon the battery compartment configuration of a given electronic product in order to allow more flexibility in the design of a line of electronic products using the same battery pack.

BRIEF SUMMARY OF THE INVENTION

Briefly stated, the present invention provides a foldable, multi-configuration battery pack having at least two casings connected together by parallel links such that the casings can be pivoted relative to each other into different configurations. An electrical connection is provided between the casings which is adapted to connect the battery cells in the casings together.

BRIEF DESCRIPTION OF SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the foldable battery pack 10 and designated parts thereof. The terminology includes the words above specifically mentioned, derivatives thereof and words of similar import.

Figure 8:
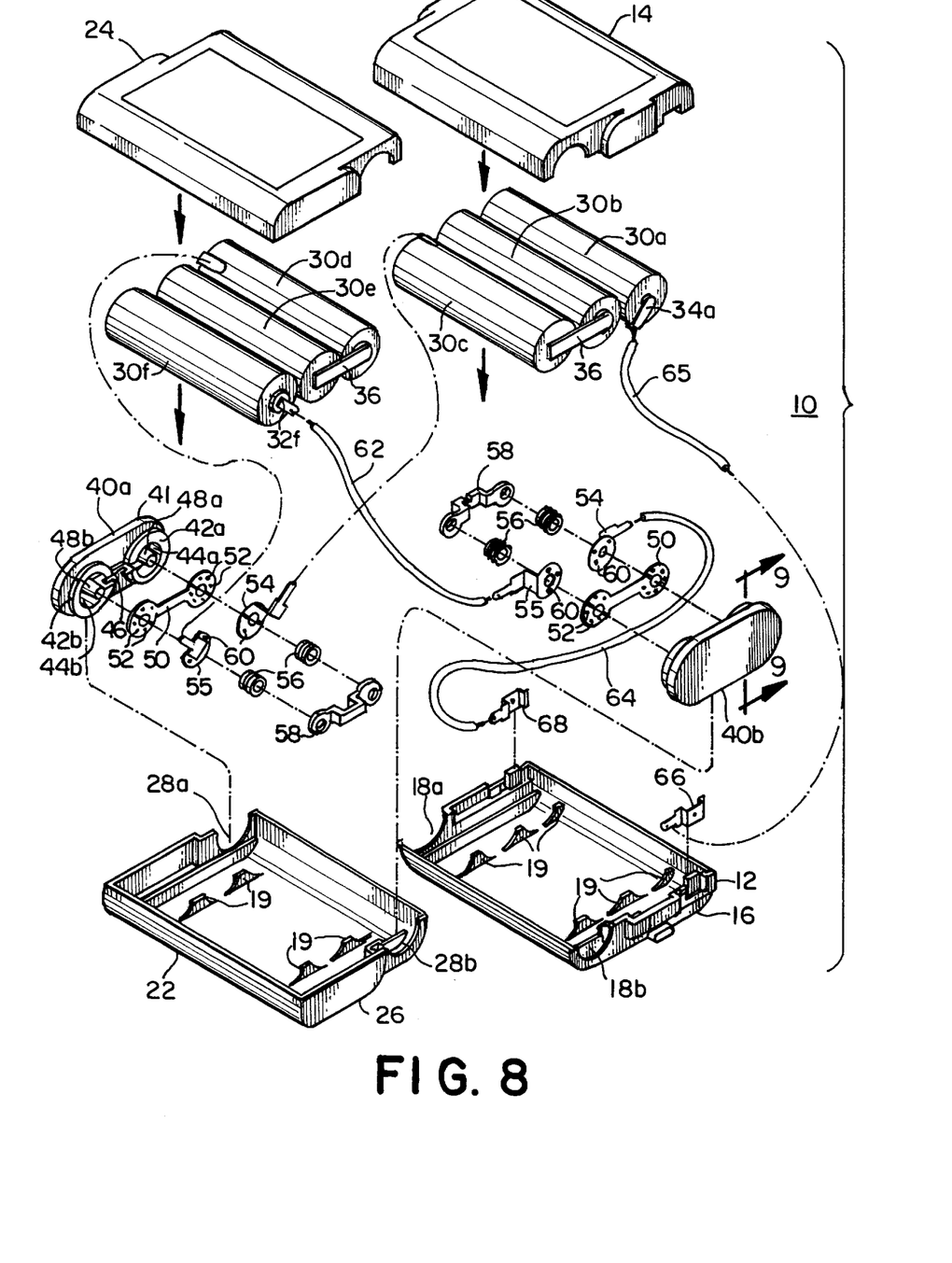
FIG. 8 is a perspective view, partially disassembled, of the foldable battery pack in accordance with the first embodiment of the present invention.

Referring now to FIGS. 1a–1d and 2–8, there is shown a first embodiment of a foldable battery pack 10 in accordance with the present invention. As shown in FIGS. 1a–1d, the foldable battery pack 10 includes a first casing 12 and a second casing 22. The first casing 12 includes an upper housing 14 and a lower housing 16. The second casing 22 also includes an upper housing 24 and a lower housing 26. Spacers 19, shown in detail in FIG. 8, are provided within the upper and lower housings 14, 16, 24 and 26, in order to hold a plurality of battery cells in position. Preferably, the casings 12, 22 are molded from a polymeric material, such as ABS, polyethylene or polyvinyl chloride. However, the upper and lower housings 14, 16, 24, 26, may be made of any other suitable material, if desired.

As shown in detail in FIGS. 2–8, three battery cells 30a–30c are located in the first casing 12 and three additional battery cells 30d–30f are located in the second casing 22. The battery cells 30a–30f each include a positive terminal 32a–32f and a negative terminal 34a–34f. Preferably, connecter tabs 36 are pre-connected to the terminals 32a–32f, 34a–34f to electrically connect the three battery cells 30a–30c together and the three battery cells 30d–30f together. Preferably, the batteries 30a–30f are connected in series as preassembled units, as shown in detail in FIGS. 5–7. The connecter tabs 36 can be connected to the terminals 32a–32f, 34a–34f by soldering, spot welding or with a conductive adhesive, if desired. In the preferred embodiment, the batteries are rechargeable Ni—MH (nickel metal hydride) batteries, and each cell produces 1.2 volts, such that the six cells connected in series produce approximately 7.2 volts. However, the number and type of battery cells can be varied to produce any other voltage desired.

While the first preferred embodiment of the invention is disclosed as using three battery cells 30a–30c and 30d–30f in each of the first and second casings 12–22, it will be recognized by those skilled in the art from the present disclosure that the number of battery cells 30a–30f in each casing 12, 22 could be varied, if desired, in order to provide a desired voltage output for the foldable battery pack 10. Additionally, the number of battery cells 30a–30f in each casing 12 and 22 does not need to be the same. For example, the first casing 12 could accommodate four battery cells 30a–30d and the second casing 22 could accommodate two battery cells 30e, 30f, or any other desired number of cells, depending upon the desired voltage, power and size requirements for the particular battery pack 10.

Figure 1A:
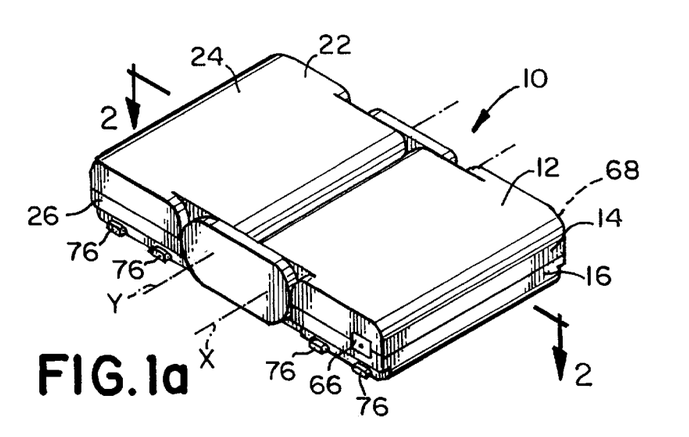
FIG. 1a is a perspective view of a first embodiment of a foldable battery pack in accordance with the present invention.
Figures 1B, 1C:
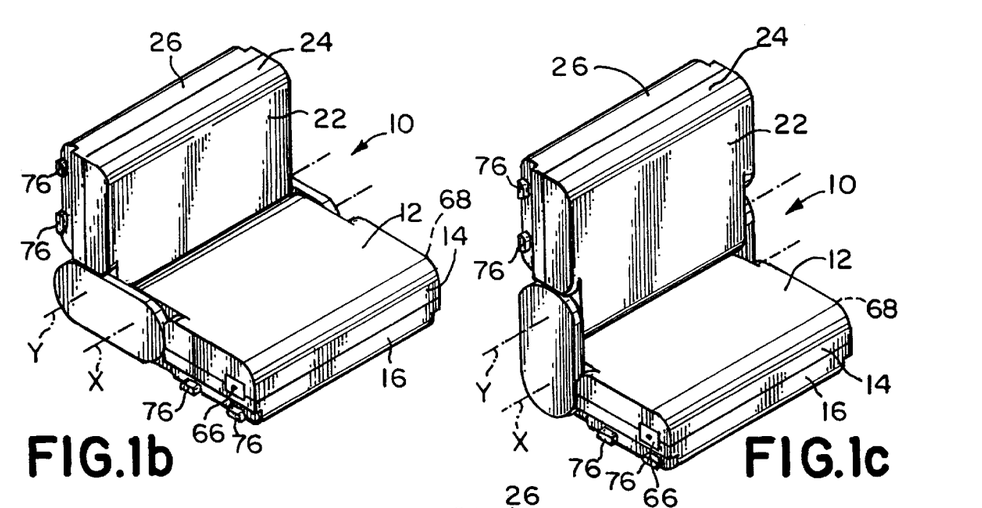
FIG. 1b is a perspective view of the foldable battery pack of FIG. 1a folded to a second configuration.
FIG. 1c is a perspective view of the battery pack of FIG. 1a folded into a third configuration.
Figure 1D:
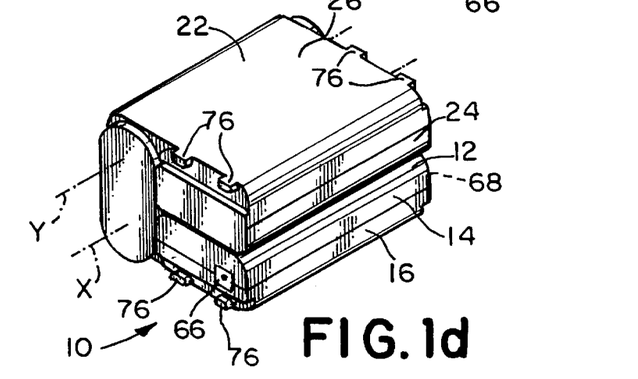
FIG. 1d is a perspective view of the battery pack of FIG. 1a folded into a fourth configuration.

Referring to FIGS. 1a–1d and 8, the two casings 12 and 22 are pivotably connected together by two parallel link assemblies 40a, 40b. A pivotable connection is formed between each end of each link assembly 40a, 40b and each casing 12, 22 creating two axes of rotation X and Y. The two axes of rotation X, Y are parallel to and offset from each other and allow the foldable battery pack 10 to be folded into various configurations, as shown in FIGS. 1a–1d via rotation of the second casing 22 relative to the first casing 12 about one or both axes X, Y. This allows the foldable battery pack 10 to be adjusted to a flat configuration, as shown in FIG. 1a, or to any other configuration in which the first and second casings 12, 14 are held at an angled position of 0° to 180° with respect to each other, including being stacked upon one another as shown in FIG. 1d. FIGS. 1a–1d illustrate only a few of the relative positions obtainable by folding the first casing 12 relative the second casing 22. It will be recognized by the skilled artisan that a wide number of positions are available given the three degrees of freedom provided by the link arrangement. For example, the first and second casings 12, 22 could also be shifted to a "Z" configuration having any desired angles between the first casing 12, the link assemblies 40, 40b, and the second casing 22, if desired.

In the first preferred embodiment, each link assembly 40a, 40b includes a rotary electrical connection. The rotary electrical connection in the first link 40a is used to provide an electrical connection between the battery cells 30a–30c in the first casing 12 and the battery cells 30d–30f in the second casing 22, such that all six cells 30a–30f are connected in series. The rotary electrical connection in the second link 40b is used to provide a return path from the batteries 30a–30f in both casings 12, 22 to one of the battery pack's external contacts 66, 68 in the first casing 12, as explained in detail below.

The components used to create the rotary electrical connection in each link assembly 40a, 40b are shown in detail in FIG. 8. Since the first and second link assemblies 40a, 40b are identical, a detailed description will be provided with respect to the first link assembly 40a. The link assembly 40a includes a body 41 having two circular bosses 42a, 42b which extend toward the first and second casings 12, 22. Each circular boss 42a, 42b has a generally T-shaped cross section, shown in detail in FIG. 9, with the first circular boss 42a being adapted to be received in a first circular opening 18a in the first casing 12, and the second circular boss 42b being adapted to be received in a first circular opening 28a in the second casing 22. The T-shaped cross section of the circular bosses 42a, 42b is used to provide a rotary connection between the link assembly 40a and the first and second casings 12, 22. The second link assembly 40b is similarly connected via the circular bosses 42a, 42b to opposing second circular openings 18b and 28b on the opposite side of the casings 12, 22.

Figure 9:
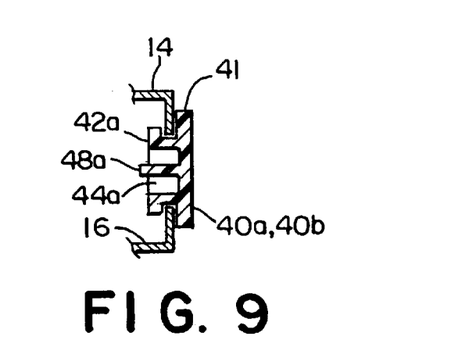
FIG. 9 is a cross-sectional view of a link assembly taken along lines 9—9 in FIG. 8.

The link assemblies 40a, 40b are preferably connected to the first and second casings 12, 22 at the time of assembly, prior to connecting the respective upper and lower housings 14, 16 and 24, 26 together. As illustrated in FIG. 8, preferably portions of the first and second circular openings 18a, 18b, 28a, 28b in the respective first and second casings 12, 22 are formed in each of the upper and lower housings 14, 16, 24, 26 of the respective casings. When the upper and lower housings 14, 16 of the first casing 12, and the upper and lower housings 24, 26 of the second casing 22, are joined together after insertion of the batteries 30a–30f to form the closed casings 12, 22, the first and second circular openings 18a, 18b, 28a, 28b are formed. The T-shaped portion of the circular bosses 42a, 42b have a greater diameter than the respective openings 18a, 18b, 28a, 28b such that the circular bosses 42a, 42b are rotatably located in the openings 18a, 18b, 28a, 28b and held to each casing 12, 22 by the T-shaped portion of the bosses 42a, 42b, as shown in FIG. 9.

Still with reference with FIG. 8, a circular recess 44a, 44b is formed in each circular boss 42a, 42b respectively. A slot 46 is defined between the centers of the circular bosses 42a, 42b and is preferably recessed into the body 41 of the link assembly 40a. Posts 48a, 48b are located in the center of the respective recesses 44a, 44b. An electrical connector 50, which is generally shaped like a dog bone, and which includes an aperture at each end that is located in complementary positions to the posts 48a, 48b, is located in the slot 46 and the circular recesses 44a, 44b. A plurality of bumps 52 are preferably located on each end of the dog bone-shaped connector 50 around the aperture. The dog bone-shaped connector 50 moves with the link assembly 40a to provide electrical continuity between the battery cells 30a–30f.

A first casing connector 54, which also includes an aperture defined therethrough, is located around the post 48a in the first circular recess 44a and is in sliding electrical contact with the first end of the dog bone-shaped connector 50. The first casing connector 54 also includes a plurality of spaced apart bumps 60 which interface with the bumps 52 located on the first end of the connector 50. A second casing connector 55 having an aperture defined therethrough is located around the second post 48b in the second circular recess 44b. The second casing connector 55 also includes bumps 60 which interface with the bumps 52 on the second end of the connector 50. Springs 56 are installed over the first and second posts 48a, 48b and are held in position by a bridge clamp 58 which is fastened to the first and second posts 48a, 48b. The springs 56 apply a spring force against the first and second casing connectors 54, 55 and the respective first and second ends of the dog bone-shaped connector 50. The bridge clamp 58 is held in position by heat swaging or mushrooming the ends of the posts 48a, 48b over to hold the bridge-clamp 58 in position. However, it will be recognized by those skilled in the art from the present disclosure that mechanical fasteners or an adhesive could be used, if desired.

Figure 2:
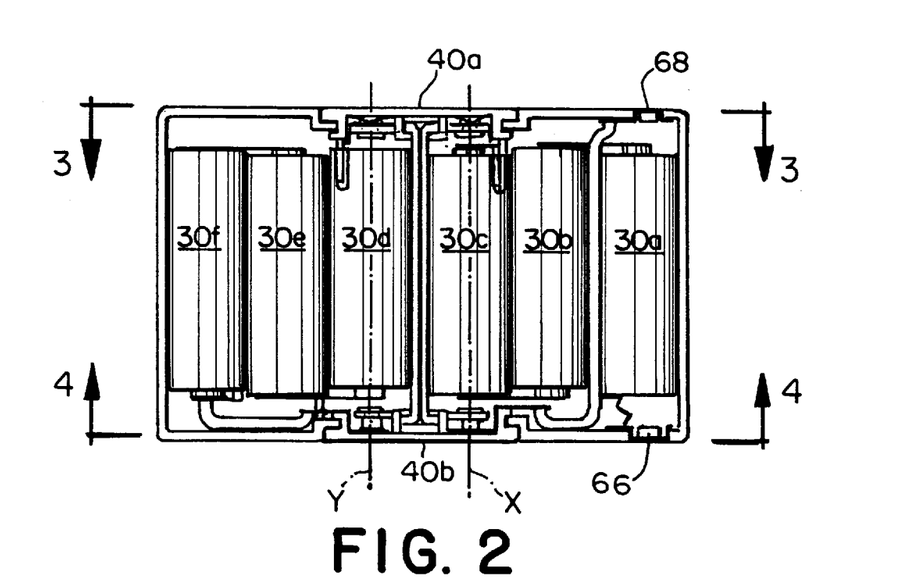
FIG. 2 is a top plan view of the battery pack of FIG. 1a with the upper housings removed.
Figure 3:
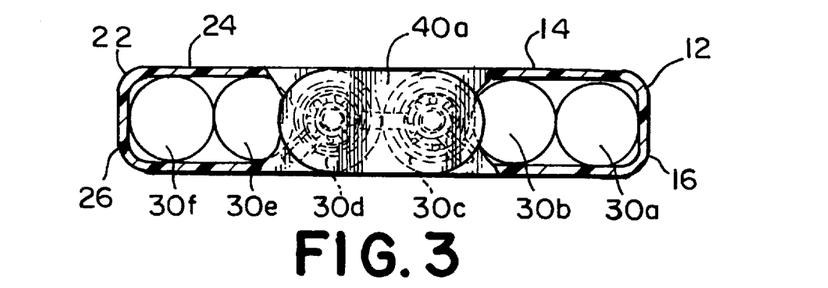
FIG. 3 is an end view taken along lines 3—3 in FIG. 2.
Figure 4:
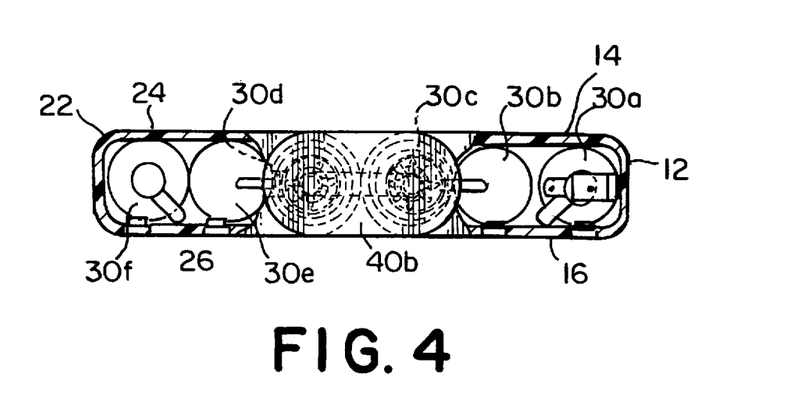
FIG. 4 is an end view taken along lines 4—4 in FIG. 2.
Figure 5:
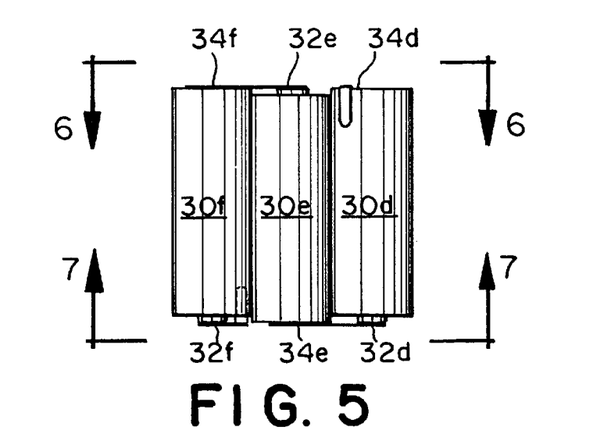
FIG. 5 is a top plan view of three battery cells connected in a series used in one casing of the battery pack in accordance with the present invention.
Figure 6:
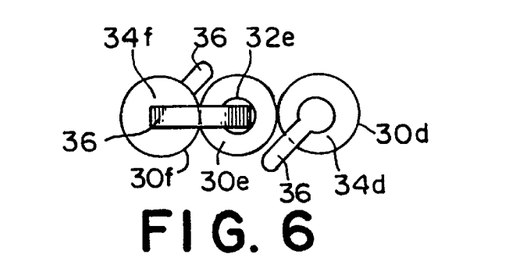
FIG. 6 is an end view taken along lines 6—6 in FIG. 5.
Figure 7:
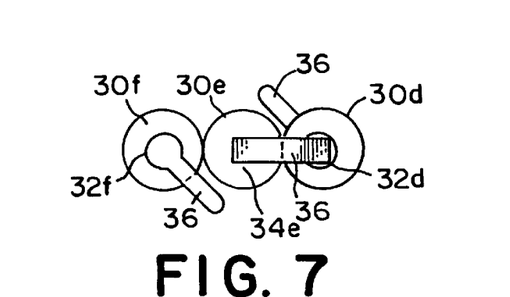
FIG. 7 is an end view taken along lines 7—7 in FIG. 5.

The first casing connector 54 is preferably connected to the connector tab 36 attached to the positive terminal 32c of the third battery cell 30c, as shown in FIG. 2. The second casing connector 55 is preferably connected to the negative terminal 34d of the fourth battery cell 30d located in the second case 22. However, those skilled in the art will recognize that the connection could be made to different cells 30–30f without departing from the spirit and scope of the present invention.

It will be understood by those skilled in the art from the present disclosure that the first and second casing connectors 54, 55 remain in a fixed position relative to each respective casing 12, 22 and do not move with the link assemblies 40a, 40b as the first and second casings 12, 22 are pivoted relative to each other about the link assemblies 40a, 40b.

The bumps 52 on the connector 50 and the bumps 60 on the first and second case connectors 54 and 55 are pressed together by the action of the springs 56 to provide positive contact between the electrical connectors 50, 54 and 55. Additionally, the bumps 52, 60 can be used to provide a detent mechanism for holding the first and second casings 12, 22 in a fixed position relative to each other. Additionally, the bumps 52 and 60 are provided for cleaning of any surface corrosion on the surface of the connectors 50, 54 and 55 which could act as an insulator between the connectors 50, 54, and 55 via a wiping contact motion whenever the pack assembly 10 is flexed.

Still with reference to FIG. 8, the second link assembly 40b is preferably used to provide a rotary electrical connection between the positive connector 32f on the sixth battery cell 30f in the second casing 22 and the second external battery pack contact 68. This is accomplished via a first conductor 62 which is connected between the positive connector tab 32f and the second casing connector 55 on the second link assembly 40b, and a second conductor 64 connected between the first casing connector 54 on the second link assembly 40b and the second contact 68 on the outside of the first casing 12. A third conductor 65 is also provided to connect the negative side 34a of the first battery cell 30a to a first external battery pack contact 66 located on the first casing 12.

In the first preferred embodiment, six battery cells 30a–30f are connected in series between the first and second external battery pack contacts 66, 68 located on the first casing 12. However, it will be recognized by those skilled in the art from the present disclosure that the contacts 66, 68 could also be located on the second casing, or one contact could be located on each casing 12, 22, if desired.

Figure 10:
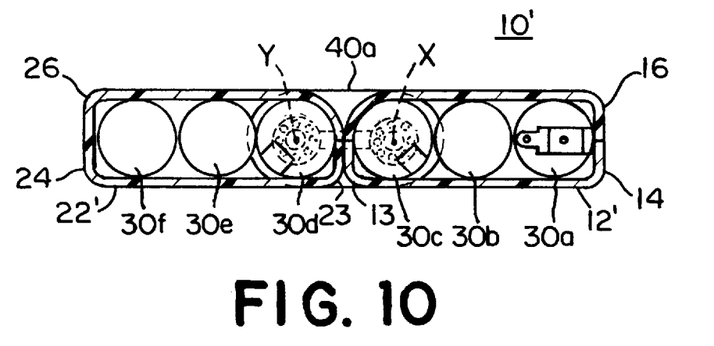
FIG. 10 is an end view similar to that of FIG. 3 showing a different configuration of the housings.
Figure 11:
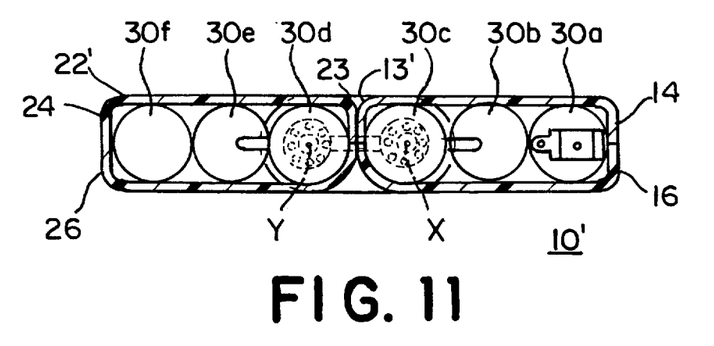
FIG. 11 is an end view similar to that of FIG. 5 showing the different configuration of the housing of FIG. 10.

Also, the rounded facing ends of the casings 12 and 22 in the first preferred embodiment permit rotation of each casing in either of two opposing directions around the X and Y axes, respectively, from the 180° angled position shown in FIG. 1a. If desired, the housings of the casings can be configured as are the slightly modified housings of casings 12' and 22' in FIGS. 10 and 11 to permit pivoting movement of each casing 12', 22' in only one direction around its respective X, Y axis. Flat facing ends 13 and 23 of casings 12' and 22' abut one another in the 180° position depicted and prevent either casing from being rotated "downward" in those figures. Pack 10' in FIGS. 10 and 11 can assume all of the positions shown in FIGS. 1a–1d but cannot assume the reverse of the positions shown in FIGS. 1b–1d. In the alternative, the link assemblies (40a, 40b) could be modified by the provision of stop surfaces (none shown) which abut casing surfaces (or stops on the casings) to prevent rotation of the casings in one of the two opposing directions from the 180° position. This modification may be desirable to at least minimize the possibility of a pack being installed incorrectly.

In use, the second casing 22 is pivoted relative to the first casing 12, either about one or both axes X, Y. The first and second connectors 54, 55 in each respective link assembly 40a, 40b remain stationary relative to the respective casing 12, 22 in which they are located. The dog bone-shaped connector 50 moves with each respective link assembly 40a, 40b, and each end of the connector 50 rotates relative to the first and second casing connectors 54, 55 as sliding contact is maintained via spring pressure from springs 56. Once the desired angle between the first and second casings 12, 22 has been set, the battery pack 10 is installed in the battery compartment (not shown) of the electronic device (not shown). Alternatively, one end of the pack 10 may first be fully or partially inserted into a recess and the remainder of the pack folded to a final configuration, for example, pressed against part of the chassis or body, or folded and completely inserted into its final installed position. Cleats 76, as shown in FIGS. 1a–1d may be provided on one or both casings 12, 22 doe securing the foldable battery pack 10 into the battery compartment.

Figure 12:
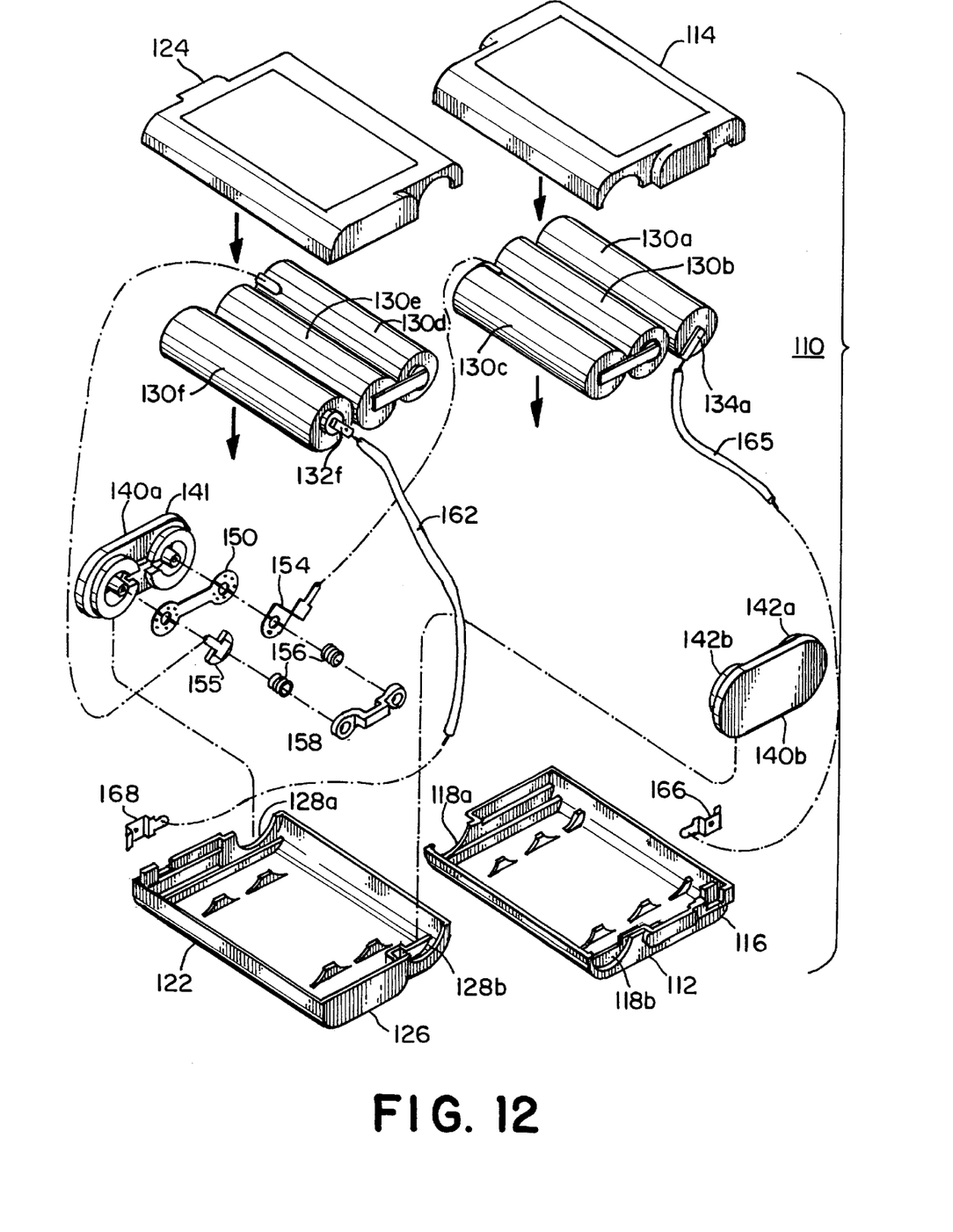
FIG. 12 is a perspective view, partially disassembled, of a second embodiment of a foldable battery pack in accordance with the present invention.

Referring to FIG. 12, a second embodiment 110 of a foldable battery pack is shown. The second embodiment of the foldable battery pack 110 is similar to the first embodiment and like elements have been identified with the similar reference numerals having the prefix "1". For example, the first casing 112 is similar to the casing 12 in accordance with the first preferred embodiment of the invention 10. Accordingly, a detailed description of these like elements is not believe to be necessary.

A description of the differences between the foldable battery pack 110 in accordance with the second preferred embodiment of the invention and the foldable battery pack 10 in accordance with the first preferred embodiment of the invention is provided below.

In the second preferred embodiment of the foldable battery pack 110, the second link assembly 140b does not include a rotary electrical connection. The link assembly 140 includes a body 141 with a circular boss having a generally T-shaped cross-section, similar to the circular boss 42a, 42b in connection with the first preferred embodiment. However, the connectors 50, 54 and 55, springs 56 and bridge clamp 58 have been eliminated. The second external battery pack contact 168 has been relocated to the second casing 122, which is similar to the first casing 22 except for the provisions for receiving the second contact 168. The first wire 162 is used to connect the positive connection 132f of the sixth battery cell 130f to the second contact 168, located in the second casing 122.

Those skilled in the art will recognize that the foldable battery pack 110 can be moved into a variety of configurations, similar to the first embodiment of the foldable battery pack 10, except that one contact 166, 168 is now located on each casing 112, 122.

Figure 13:
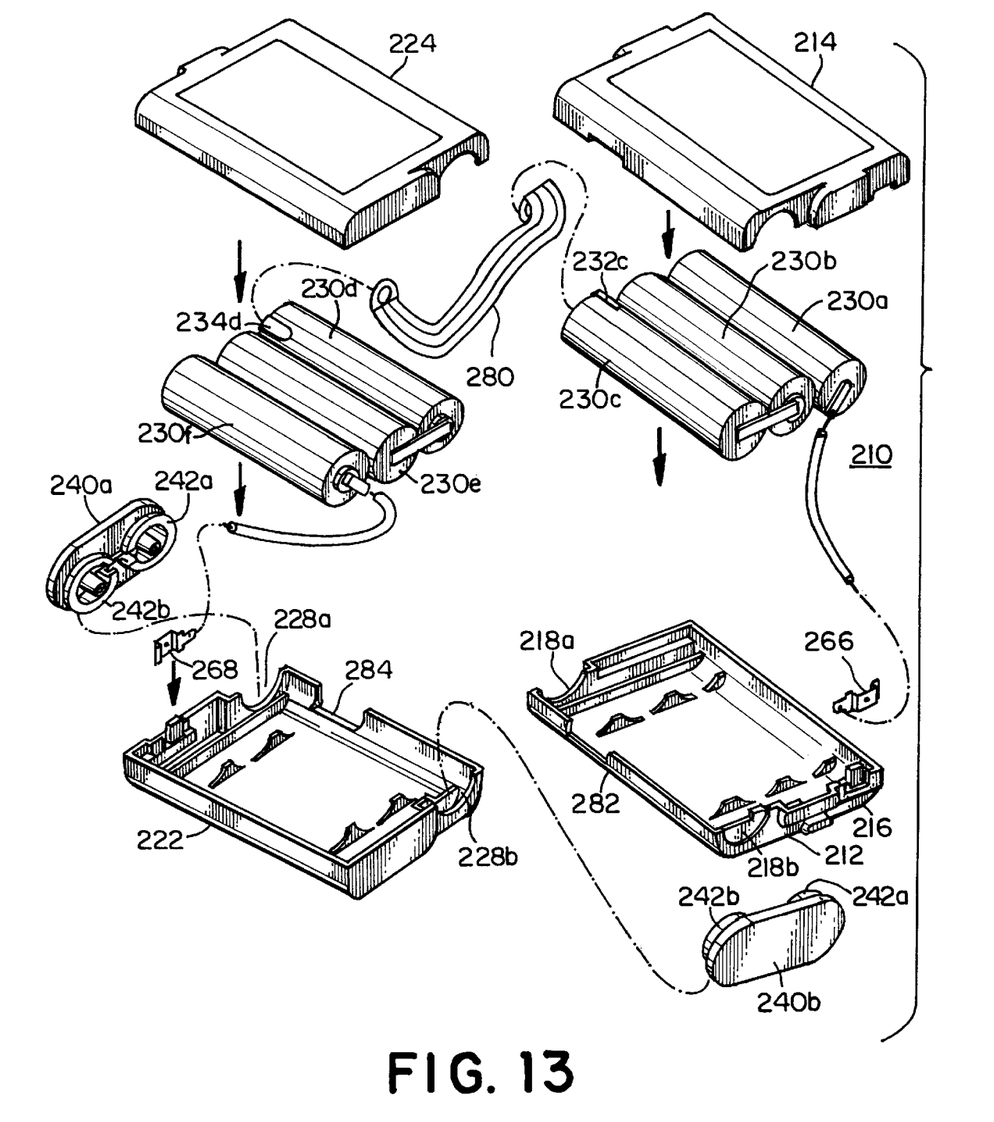
FIG. 13 is a perspective view, partially disassembled of a third embodiment of a foldable battery pack in accordance with the present invention.

Referring now to FIG. 13, a third embodiment 210 of a foldable battery pack in accordance with the present invention is shown. The third embodiment of the foldable battery pack 210 is similar to the second embodiment 110 and similar elements have been identified with the similar reference numerals having the hundreds digit "2". For example the first casing 212 in accordance with the third embodiment of the invention 210 is similar to the first casing in accordance with the second embodiment of the invention. Accordingly, a detailed description of these like elements is not believe to be necessary.

A description of the differences between the foldable battery pack 210 in accordance with the third preferred embodiment of the invention and the foldable battery pack 110 in accordance with the second preferred embodiment of the invention is provided below.

In the third preferred embodiment of the foldable battery pack 210, both link assemblies 240a, 240b are similar to the link 140 in the second preferred embodiment, and do not contain rotary electrical connections.

A flexible printed circuit board ("PCB") wire trace 280 is used to provide an electrical connection between the positive connector 232c of the third cell 230c in the first casing 212 and the negative connector 234d on the fourth battery cell 230d located in the second casing 222. Notches 282, 284 are located in the first and second casings 212, 222, respectively, and the flexible PCB wire trace passes through the notches 282, 284 and between the respective casings 212, 222. This eliminates the rotary electrical connection and the potential for failure of the battery pack 210 due to poor electrical continuity across the rotary electrical connection, while still providing the multiple configuration adjustability, similar to the battery packs 10, 110 in accordance with the first and second embodiments.

Figure 14:
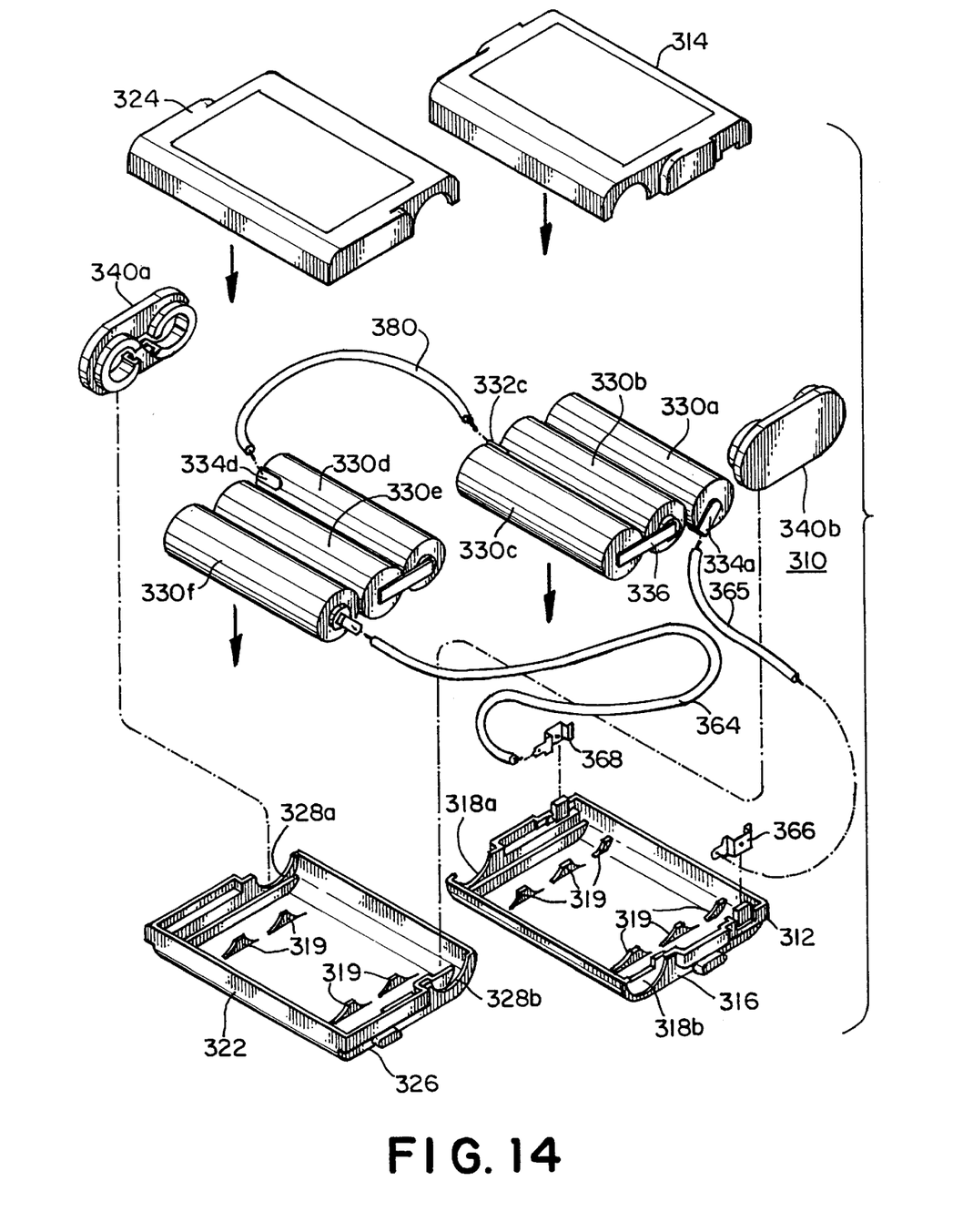
FIG. 14 is a perspective view, partially disassembled of a fourth embodiment of a foldable battery pack in accordance with the present invention.

Referring now to FIG. 14, a fourth embodiment 310 of a foldable battery pack in accordance with the present invention is shown. The fourth embodiment of the foldable battery pack 310 is similar to the third embodiment 210 and similar elements have been identified with similar reference numerals having the hundreds digit "3". For example, the first casing 312 in accordance with the fourth embodiment of the invention 310 is similar to the first casing in accordance with the third, second and first embodiments of the invention. Accordingly, detailed description of these like elements is not believed necessary. Like the third embodiment of the foldable battery pack 210, the link assemblies 340a, 340b do not contain rotary electrical connections. However, unlike the third preferred embodiment 240, the fourth embodiment 310 dispenses with the flexible printed circuit board wire trace 280. Instead, a single flexible wire 380 is used to provide an electrical connection between the positive connector 332c of the third cell 330c in the first casing 312 and the negative connector 334d on the fourth battery cell 330d located in the second casing 322. The wire can be passed through the recess provided in the link assembly 340a previously used to receive the electrical connectors 50, 150, etc. The central posts may also be deleted from the link assembly 340a to provide room for the flexible wire lead 380. This simplifies the design even further.

It will be appreciated by those skilled in the art that changes could be made to the embodiments described above without departing from the broad inventive concept thereof. For example, while link assemblies are desired on each of two opposing sides of the pack, it would be possible to eliminate one of the link assemblies, particularly assembly 140b, 240b or 340b, which do not protect or conceal any electrical connection. Further, while two rigid casings are shown hinged together in each embodiment, battery packs of the present invention may comprise three or more such casings, the individual cells of which may be connected together in any of the ways specifically described and in any obvious variations thereto. While the longitudinal axes of the individual cells are shown parallel to the pivot axes, they need not be so. Furthermore, the cells in each casing need not be aligned in a common plane, but might be clustered together in a bundle. While each casing is shown to be made from a pair of preformed, mating housings, the casings can be formed around the cells by wrapping or molding, or an open frame provided to receive the cells which are held in position on or in the frame by an appropriate wrapping, encapsulation, other bonding, etc. It is understood, therefore, that this invention is not limited to the particular embodiments disclosed, but it is intended to cover modifications within the spirit and scope of the present invention as defined by the appended claims.

What is claimed is:

1. A foldable, multi-configuration battery pack comprising:
   at least a pair of casings, each casing housing at least a pair of battery cells;
   a first rigid link having opposing ends, each end of the first link being pivotally coupled with a first end of a separate one of the pair of casings such that the pair of casings pivot with respect to one another and with respect to the first link about separate and laterally spaced apart axes transverse to the first link; and
   an electrical circuit connecting together all of the battery cells in at least the pair of casings.

2. The foldable, multi-configuration battery pack of claim 1 wherein at least part of the electrical circuit extends between the two casings through the first rigid link.

3. The foldable, multi-configuration battery pack of claim 2 further comprising a second rigid link having opposing ends pivotally coupled with second ends of each casing of the pair opposite the ends of the casings pivotally coupled with the rigid first link.

4. The foldable, multi-configuration battery pack of claim 3 wherein at least another part of the electrical circuit extends between the two casings through the second rigid link.

5. The foldable, multi-configuration battery pack of claim 2 wherein the first rigid link includes a generally non-electrically conductive rigid body and wherein the electrical circuit includes a first separate electrical connector physically coupled with the rigid body and extending at least between ends of the rigid body pivotally coupled with the pair of casings.

6. The foldable, multi-configuration battery pack of claim 5 further comprising a second separate electrical connector from a first one of the pair of casings in sliding electrical contact with the first separate electrical connector associated with the first rigid link and a third separate electrical connector from a second one of the pair of casings in sliding electrical contact with the first separate electrical connector associated with the first rigid link.

7. The foldable, multi-configuration battery pack of claim 5 wherein the first separate electrical connector associated with the first rigid link is a length of insulated wire.

8. The foldable, multi-configuration battery pack of claim 5 wherein the first separate electrical connector associated with the first rigid link is a flexible, printed circuit board wire trace.

9. The foldable, multi-configuration battery pack of claim 1 wherein the first rigid link includes a first separate electrical connector, and a detent mechanism is provided between at least one of the pair of casings and at least one of the first rigid link and the first separate electrical connector, the detent mechanism being configured to releasably hold at least the one casing in any one of a plurality of discrete angular positions relative to the rigid link.

10. The foldable, multi-configuration battery pack of claim 1 wherein the electrical circuit includes a pair of external electrical contacts exposed on only one casing of the battery pack.

11. The foldable, multi-configuration battery pack of claim 1 wherein each casing is generally rigid.

12. A foldable, multi-configuration battery pack comprising:

at least a pair of battery containing casings;

a first rigid link having opposing ends, each end of the first rigid link being pivotally coupled with an end of a separate one of a pair of casings such that the pair of casings are located generally side-by-side and pivot with respect to one another and with respect to the first rigid link about separate and laterally spaced apart axes transverse to the first rigid link; and a circuit electrically coupling together the pair of battery containing casings through the first rigid link.

13. The foldable, multi-configuration battery pack of claim 12 wherein each casing includes at least a pair of battery cells.

* * * * *